United States Patent

[11] 3,624,001

[72] Inventor Gert G. Eberhardt
 Philadelphia, Pa.
[21] Appl. No. 504,071
[22] Filed Oct. 23, 1965
[45] Patented Nov. 30, 1971
[73] Assignee Sun Oil Company
 Philadelphia, Pa.

[54] POLYMERIZATION CATALYSTS
 19 Claims, No Drawings
[52] U.S. Cl............................. 252/431,
 260/93.5, 260/94.6, 260/84.7
[51] Int. Cl................................. B01j 11/00,
 C08f 7/04, C08f 19/00
[50] Field of Search........................... 252/431,
 426; 260/94.6, 84.7

[56] References Cited
UNITED STATES PATENTS
3,163,630 12/1964 Pampus et al.......... 252/431
3,337,475 8/1967 Fukui et al ................. 252/431

Primary Examiner—Patrick P. Garvin
Assistant Examiner—Patrick P. Garvin
Attorney—Donald R. Johnson ABSTRACT: Substantially soluble olefinic polymerization catalysts are obtained with an organo-calcium or -barium compound of the structure

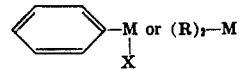

where M is calcium or barium, X is chlorine, bromine or iodine and R is a hydrocarbon radical having 1-30 carbon atoms and a nonaromatic, tertiary chelating diamine.

POLYMERIZATION CATALYSTS

The present invention relates to a novel polymerization catalyst system and the method of preparation for said system. The catalyst of the present invention is useful for promotion of the polymerization of styrenes or dienes under very mild conditions.

It is known in the art that organoalkali metal compounds will act as a catalyst for certain alkylation such as the alkylation of benzene and toluene with ethylene. In applicant's U.S. Pat. No. 3,206,519 issued Sept. 14, 1965, a catalyst system composed of a nonaromatic amine with LiR and NaR' wherein R and R' are hydrocarbon radicals having 1-30 carbon atoms is disclosed for telomerizing ethylene with aromatic hydrocarbons whereby alkyl aromatics having an unbranched alkyl chain or a chain having a single branch at the alpha carbon atom are produced.

The present invention deals with catalysts that provide a means of initiating the polymerization of styrenes and dienes or mixtures thereof to produce long chain polymers and copolymers. It has been found that the combination of an organoalkaline earth metal said alkaline earth metal selected from the group consisting of calcium and barium with a nonaromatic tertiary chelating diamine provides a highly effective catalyst for promoting this type of reaction.

In accordance with the invention the styrene, diene or mixtures thereof is reacted by contacting these materials at a temperature of 28°-35° C. in the presence of a catalyst system which is a combination of a nonaromatic tertiary chelating diamine with an organoalkaline earth metal compound said alkaline earth metal selected from the group consisting of calcium and barium.

Specific examples of the application of the present invention include the polymerization of styrene to produce polystyrene. A few of the specific diolefins that may be polymerized are: 1,3-butadiene, 2,3-dimethyl-1,3-butadiene, 2-methyl-1,3-butadiene, 1,3-pentadiene, 1,4-pentadiene, 2,4-pentadiene, 2,4-hexadiene and the like. Copolymerization may also be promoted with the present catalyst system such as that between styrene and 1,3-butadiene.

The catalyst system of the present invention is preformed and then added to the hydrocarbon material to be polymerized or to a suitable solvent to which the material to be polymerized is added. As previously indicated the essential ingredients of the present catalyst are an organo-calcium or organo-barium compound and a nonaromatic, tertiary chelating diamine. These components when admixed form coordination compounds which are the active catalyst.

The catalyst system according to the present invention involves a nonaromatic, tertiary chelating diamine in combination with an organo-alkaline earth metal component selected from the group consisting of

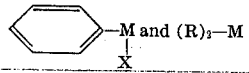—M and (R)₂—M
                                  |
                                  X wherein M is an alkaline earth metal selected from the group consisting of calcium and barium, X is a halogan selected from the group consisting of chlorine, bromine and iodine and R is a hydrocarbon radical having 1-30 carbon atoms. The hydrocarbon group can be any hydrocarbon radical of the specified number of carbon atoms selected from the group consisting of alkyl, cycloalkyl, alkenyl, phenyl, alkylphenyl and phenylalkyl. The following are examples of suitable hydrocarbon groups: ethyl, propyl, isopropyl, n-butyl, isobutyl, tertiary butyl, n-amyl, isoamyl, n-octyl, isooctyl, vinyl, alkyl, crotyl, cyclopentyl, methylcyclohexyl, phenyl, benzyl, tolyl, xylyl, cumyl, methylbenzyl, 2-phenylethyl and the like.

It was found in the synthesis of the

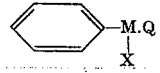—M.Q
                                  |
                                  X catalyst system wherein M and X have the significances previously shown and Q is a nonaromatic, tertiary chelating diamine that the use of hydrocarbon halides other than the phenyl halide as starting material did not result in a hydrocarbonalkaline earth metal halide but instead the halogen reacted preferentially with the amine producing an undesirable product, to the exclusion of the hydrocarbon-alkaline earth metal halide-amine complex.

In the synthesis of the (R)₂–M.Q catalyst system, wherein R, M and Q have the significance previously shown, it was found that any dihydrocarbon mercury compound wherein the hydrocarbon radicals have 1-30 carbon atoms and are selected from the group consisting of alkyl, cycloalkyl, alkenyl, phenyl, alkylphenyl and phenylalkyl can be employed to produce the catalyst system.

The amine component of the catalyst system can be any nonaromatic, tertiary chelating diamine, i.e., diamines in which the two nitrogen atoms are so spaced in the molecule that the diamine can form a chelate with the alkaline earth metal component of the catalyst. These chelating amines can be of either of two subtypes depending upon whether the molecular structure is flexible or rigid. Examples of the flexible subtype are N,N'-tetramethylethylene and N,N'-tetrapropylethylene diamine. Examples of the rigid subtype are: N,N'-tetraalkyl-1,2-diaminocyclo-hexane, N,N'-dialkyl-bispinin and sporteine. The flexible subtype must be of the type that forms five or six membered chelate rings. The rigid subtype have the nitrogen atoms so positioned with respect to each other that metal chelate rings can be readily formed in spite of the lack of flexibility in the molecular structure.

Other types of amines which are not of the type specified previously are inoperable in the present invention. For example mono and diamine wherein one or more nitrogens are in bridgehead positions, tertiary monoamines and nontertiary mono and diamines will not operate to produce the instant catalyst. Such inoperative amines include for example triethylene diamine, triethylene amine, ethylamine and ethylene diamine.

The proportion of the chelating amine to the alkaline earth metal component incorporated in the reaction mixture can vary widely. The ratio of nitrogen to alkaline earth metal can be in the range of 0.1:1 to 100:1, however, the preferred range is 0.5:1 to 20:1. Generally a stoichiometric amount of amine is employed although in some cases an excess may be desirable.

Care should be taken to exclude air and water from the polymerization reaction mixture since these materials will poison the catalyst.

The polymerization reaction is carried at atmospheric pressure, although sub or super atmospheric pressure may be employed, in the temperature range of 28° to 35° C. Generally, room temperature is sufficient for the reaction so that by addition of a catalytic amount of catalyst the polymerization proceeds readily to completion.

Theoretically, the present catalyst system is a true catalyst and should last indefinitely. Once the polymerization reaction is initiated by the catalyst, it is observed to go to completion without the addition of further catalyst. However, in the case of a continuous polymerization, it has been observed that the activity of the catalyst decreases and additional catalyst must be added to the process. The degree of polymerization may be controlled by the addition of water to the reaction mixture at the appropriate time. This deactivates the catalyst by breaking the catalyst complex, releasing the amine and converting the alkaline earth metal to its hydroxide. The deactivated catalyst may be separated from the polymer, in the case of water-soluble amines by removing the water phase. The water-insoluble amine may be removed by treatment of the organic phase by extraction with an aqueous mineral acid. The amine salt can then be decomposed by addition of caustic. If the polymerization is allowed to go to completion, the catalyst may be separated from the polymer by dissolving the polymer in a suitable hydrocarbon solvent and washing the hydrocarbon solvent with water or aqueous mineral acid and recovering the amine. The amine can be recovered from aqueous solution by distillation. Alcohol may be used instead of water to deactivate the catalyst.

The mechanism of the polymerization reactions carried out with the catalyst system of the present invention involves propagation of a chain by the addition of the monomer molecules between the alkaline earth metal atom and the adjacent carbon atoms. Because the chelating diamines employed in the present invention solubilize the organo-calcium compounds in hydrocarbons at least to some extent, the polymerization reaction occurs in solution.

The following examples are intended to illustrate the present invention, not to limit its scope.

EXAMPLE I

Freshly prepared calcium filings were amalgamated by rapid stirring under benzene with a small amount of Hg. About 0.2 mole of these filings were placed in a three-neck glass flask together with 50 cc. of benzene and 0.1 mole tetramethylethylene diamine under a nitrogen atmosphere. 0.2 cc. of 3 molar propyl-Mg-Br solution in ether was added as initiator. Now 0.1 mole phenyliodide was added over a 1-hour period at 0° C. with rapid stirring, during which period the formation of a whitish product was noted. The stirring was continued for 1 hour after the addition of the phenyliodide. Throughout the reaction small samples of the reaction mixture were removed and examined by vapor phase chromatography whereby it was possible to follow the disappearance of the phenyliodide as it was converted to phenyl-calcium compound, i.e.

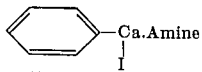

The presence of the Ca-phenyl bond was shown by the reaction with benzophenone which yielded at least 70 percent tritanol based on phenyliodide. The organo-calcium product is partially soluble; about 1 g. in 100 cc. of benzene. The ratio of Ca/I of the soluble part is 1.75/I, indicating a disproportionation of the phenylcalciumiodide into an organo-rich, more soluble part and into an iodine-rich, less soluble part.

EXAMPLE II

Approximately 0.2 mole of fresh calcium filings were placed in a small Erlenmeyer flask together with 50 cc. of benzene, 0.1 mole diphenylmercury, 5 cc (0.03 mole) tetramethylethylene diamine and 0.1 g butylithium (initiator). The flask was swept with nitrogen and magnetically stirred at room temperature for about 15 hours. After this time, all of the organomercury had disappeared and a white, partially soluble organo-calcium compound was formed, e.g.

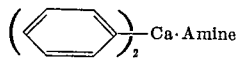

To establish the presence of the Ca-phenyl bond, 0.2 mole benzophenone in benzene was added to the reaction mixture, solubilizing all material except the excess calcium metal. The reaction product was removed from the unreacted calcium and 0.15 mole tritanol was isolated together with 0.1 mole calcium as oxolate.

The reaction of diphenylmercury may be expressed as

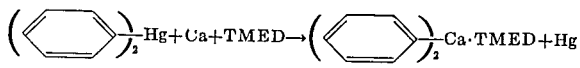

EXAMPLE III

To about 200 grams of styrene at room temperature and atmospheric pressure is added in a one liter flask 0.2 gram of the phenylcalciumiodide-amine catalyst system produced according to example I. The styrene was readily polymerized to solid mass in a matter of minutes.

EXAMPLE IV

Example III was repeated using the diphenyl calcium amine catalyst system of example II to initiate polymerization. The reaction proceeded as in example III.

EXAMPLE V

About 12 g. of the diphenyl calcium amine catalyst system of example II is added to 100 ml. of benzene. About 3 liters of 1,3-butadiene is passed into the benzene at the rate of 1 liter per hour at 27° C. The organic phase is treated with water which is separated from the organic phase and the benzene is removed from the polymer by distill from the polymer by distillation.

The presence of a nonaromatic, tertiary chelating diamine was found to be essential for the synthesis of the hydrocarbon alkaline earth metal components of the present invention.

The invention claimed is:

1. A catalyst system consisting essentially of a nonaromatic, tertiary chelating diamine in combination with an organo-alkaline earth metal component selected from the group consisting of

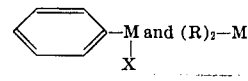

where M is an alkaline earth metal selected from the group consisting of calcium and barium, X is a halogen selected from the group consisting of chlorine, bromine and iodine, and R is a hydrocarbon radical having 1–30 carbon atoms and selected from the group consisting of alkyl, cycloalkyl, alkenyl, phenyl, alkylphenyl and phenylalkyl, the ratio of nitrogen to alkaline earth metal being in the range of 0.1:1 to 100:1.

2. A catalyst system according to claim 1 wherein the organoalkaline earth metal component is

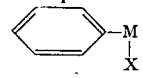

3. A catalyst system according to claim 2 wherein M is calcium.

4. A catalyst system according to claim 3 wherein X is iodine.

5. A catalyst system according to claim 2 wherein M is barium.

6. A catalyst system according to claim 1 wherein the organoalkaline earth metal component is $$(R)_2-M.$$

7. A catalyst system according to claim 6 wherein M is calcium.

8. A catalyst system according to claim 7 wherein R is phenyl.

9. A catalyst system according to claim 7 wherein R is an alkyl group.

10. A catalyst system according to claim 9 wherein said alkyl group is ethyl.

11. A catalyst system according to claim 7 wherein R is a cycloalkyl group.

12. A catalyst system according to claim 11 wherein said cycloalkyl group is cyclopentyl.

13. A catalyst system according to claim 6 wherein M is barium.

14. A catalyst system according to claim 13 wherein R is phenyl.

15. A catalyst system according to claim 13 wherein R is an alkyl group.

16. A catalyst system according to claim 15 wherein said alkyl group is ethyl.

17. A catalyst system according to claim 16 wherein said alkyl group is propyl.

18. A catalyst system according to claim 4 wherein the diamine is N,N'-tetramethylethylene diamine.

19. A catalyst system according to claim 8 wherein the diamine is N,N'-tetramethylethylene diamine.

* * * * *